United States Patent Office 3,790,685
Patented Feb. 5, 1974

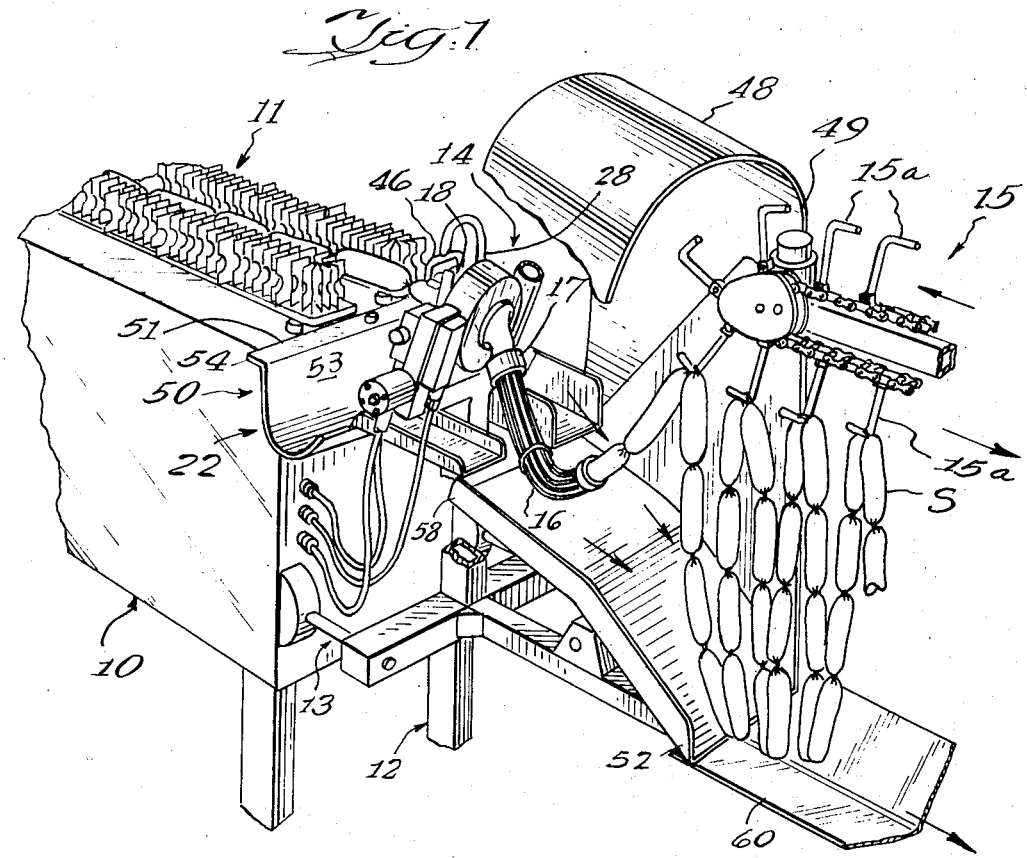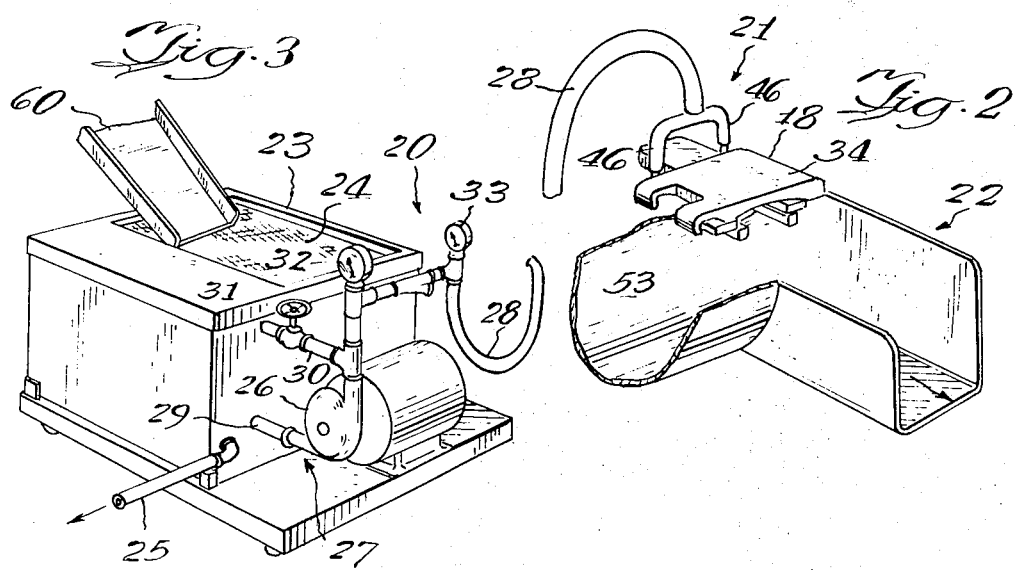

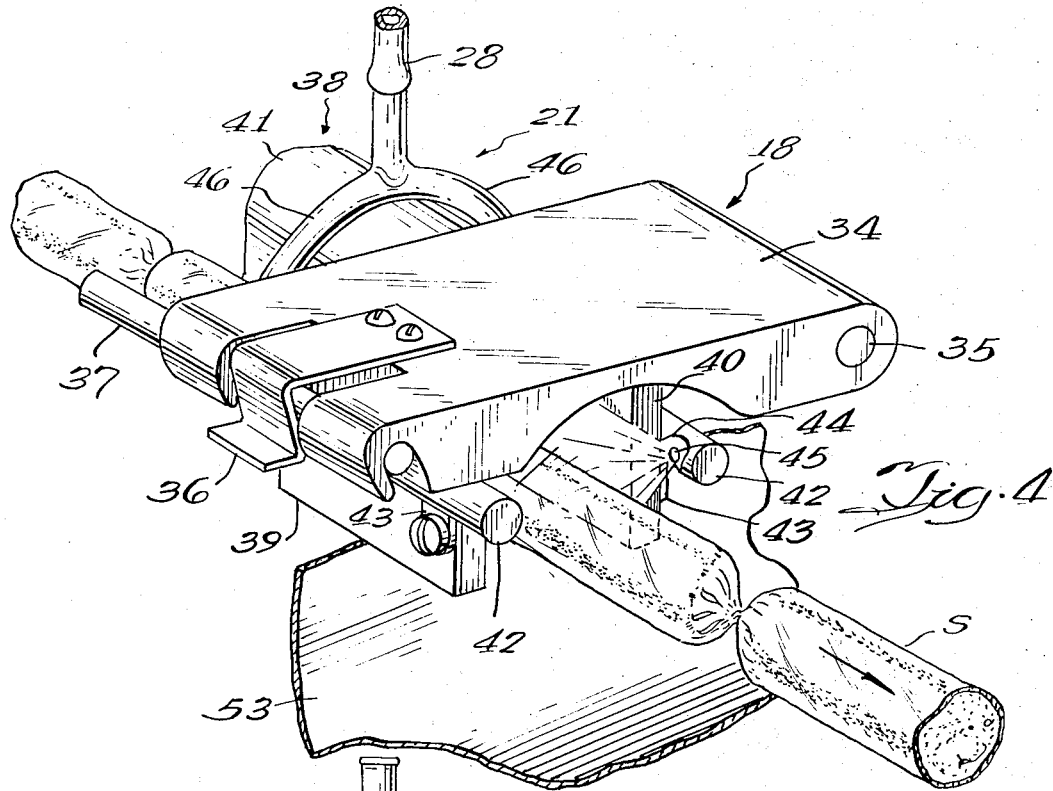

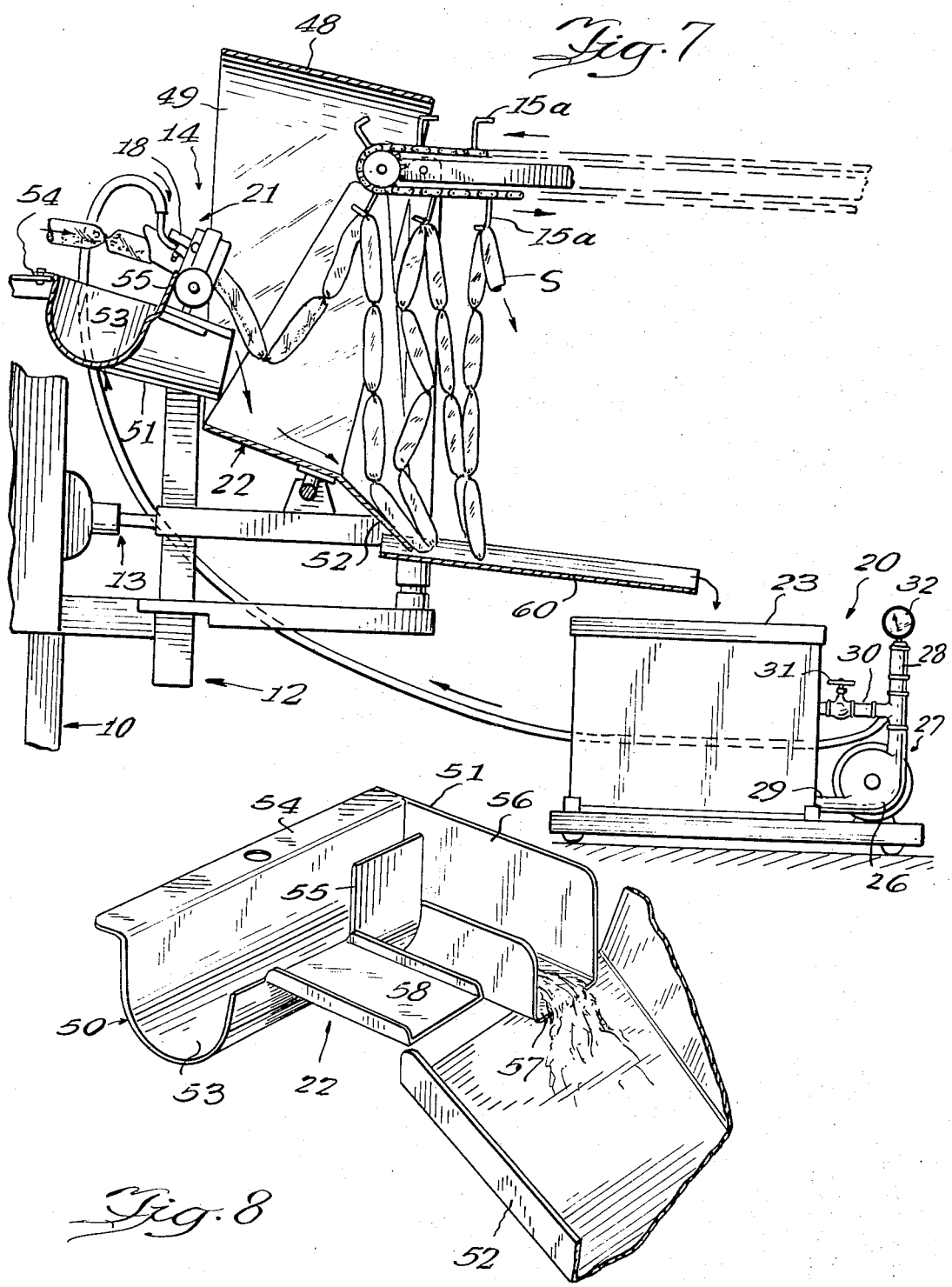

3,790,685
METHOD OF APPLYING LIQUID SURFACE TREATING MATERIALS TO SAUSAGES
William H. Criss, Hinsdale, and John R. Shackelford, Roselle, Ill., assignors to Stange Co.
Original application Nov. 30, 1970, Ser. No. 93,609. Divided and this application Feb. 22, 1972, Ser. No. 228,104
Int. Cl. A22c 18/00
U.S. Cl. 426—302        2 Claims

ABSTRACT OF THE DISCLOSURE

A method of applying liquid surface treating materials to a linked string of sausages in a continuous cellulose casing immediately after stuffing and linking and before any other processing occurs. As the linked string of sausages moves in a predetermined path it is subjected to a spray consisting of a liquid surface treating material, the liquid being delivered under pressure to a spray head from a supply tank by a pump in susbtantial excess of the quantity required for surface treatment, and the excess liquid being returned to the tank.

This is a division, of application Ser. No. 93,609 filed Nov. 30, 1970 now Pat. No. 3,699,877.

BACKGROUND OF THE INVENTION

Modern sausage making machinery, a typical example of which is seen in Townsend Pat. 3,191,222, issued June 29, 1965, continuously stuffs meat emulsion into a collapsed, tubular cellulose sausage casing which, in its collapsed condition, is between 2 and 3 feet long and when fully extended may be anywhere from 55 to 110 feet long. As the casing is stuffed and extended toward its full length it is mechanically twisted progressively at regular intervals so that a continuous string of linked sausages emanates from the machine for further processing. In the machine of Pat. 3,191,222 the sausages are swung in loops by a looping mechanism which festoons them on a continuously moving take-away conveyor from which they may be removed on a stick by an operator for further processing.

There are certain treatments to which sausages may be subjected after the linked string is formed and before any further processing. Thus, for example, one of the dyes which has U.S. government approval for use in foods for human consumpton is Orange B which, if it is applied to the cased sausages before they are smoked, gives the finished sausages a desired red color without penetrating the meat. This is essential because federal government regulations prohibit penetration of the meat by the dye. Some available dyes may be applied to the casing when it is manufactured, but this is not possible with Orange B because the casings are stored under alkaline conditions which convert the Orange B to Orange K, and Orange K will penetrate the meat emulsion and thus cannot be used.

Likewise, other liquid surface treating materials, such as liquid smoke, may be applied to a newly linked string of sausages; or in certain types of sausages an acid wash is required.

Heretofore there has been no apparatus which can apply liquid surface treating materials to the entire surface of sausages immediately after the cellulose casing is stuffed and formed into links, and before the string of linked sausages is subjected to any further processing. Part of the reason is that modern sausage making machinery is very compact and operates at extremely high speed.

SUMMARY OF THE INVENTION

In accordance with the method of the present invention, a linked string of sausages consisting of cellulose casing stuffed with meat emulsion and formed into links is subjected to a spray consisting of a liquid surface treating material as the linked string is moving through a predetermined path immediately after link formation and before any further processing.

Liquid sprays are directed at opposite sides of the moving string of linked sausages, so that the sprays are opposed to one another, and the height of the space occupied by the sprays is such that they impinge upon one another above and below the sausages.

The liquid surface treating material is drawn from a supply source in a quantity substantially in excess of that required for surface treatment of the sausages, is pumped through spray nozzles under pressure, and the excess liquid is trapped and returned to the supply source.

The specific embodiment of the apparatus disclosed herein for carrying out the method constitutes an attachment, or accessory, for a sausage making machine as disclosed and claimed in Townsend U.S. Pat. 3,191,222, issued June 29, 1965. Such a machine includes, generally, a hopper for collapsed cellulose casings which may extend from a collapsed length of about 2 to 3 feet to an extended length of 55 feet to 110 feet. A collapsed casing is continuously stuffed with meat emulsion as it is extended to its full length, and the stuffed casing is progressively twisted at regular intervals in a linking assembly to provide a continuous string of linked sausages.

The continuous string of linked sausages leaves the linking assembly in a predetermined path which takes it into a looping mechanism where progressive, relatively short segments of the string of sausages are swung in a loop which automatically festoons the string on successive hanger brackets, or hooks of a continuously moving take-away conveyor.

In order that the linked string of sausages moving from the linking assembly into the looping mechanism may be properly guided and not forced up or down in a way which could jam sausages in the mechanism, and in order that the linked string may retain its predetermined path between the linking assembly and the looping mechanism, the apparatus of Pat. 3,191,222 includes a link deflector in the form of a pivoted arm provided with a U-shaped guide which, when the link deflector is in place, forms an arch spanning the linked string of sausages as it moves from the linking assembly to the looping mechanism.

The apparatus for performing the present method has a spray head consisting of a pair of small nozzles which are mounted on the two sides of the U-shaped link deflector so as to direct the opposed sprays toward the two sides of the sausages as they pass through the link deflector.

The means for trapping and returning excess liquid to the supply tank consists of a hood which surrounds the top and two sides of the space traversed by the looping mechanism as it swings the successive segments of the string of sausages to festoon them on the take-away conveyor, together with troughs which are beneath the spray head and beneath the space traversed by the looping mechanism in operation.

Preferably the surface treating liquid is continuously circulated in a circulating conduit which takes it from the bottom of the supply tank, through a pump and back to the supply tank, with a spray conduit between the pump and the return conduit to the supply tank and an adjustable metering valve in the return conduit which can be adjusted to provide any desired back pressure within predetermined limits and thereby vary the amount of liquid from the circulating conduit which is forced through the spray conduit and out the spray nozzles under pressure.

Commercially available sausage making machines of the type disclosed in Pat. 3,191,222 are capable of producing from 3,000 to 3,650 pounds of sausages an hour. A common size of frankfurter, for example, has ten frankfurters per pound, so the machines produce from 30,000 to 36,500 frankfurters an hour. The smallest machine fills, links and festoons a 55 foot casing in 13 seconds, while the largest machine fills, links and festoons a 110 foot casing in 28 seconds.

From the foregoing figures on rate of production, it is quite apparent that the linked sausages move from the linking assembly to the looping mechanism at speeds of approximately 4 to 4¼ feet per second. The total length of the link deflector is about 1¾ inches, and the actual space occupied by the opposed nozzles of the spray head extends along the path of travel of the linked string of sausages no more than about ¼ inch, so a given point on a linked string of sausages passes the area occupied by the spray head nozzles in about a 200th of a second. Even with nozzles which develop a wide angle spray each point on a sausage is subjected to the spray for no more than about a 50th of a second.

BRIEF DESCRIPTION OF THE DRAWINGS

FIG. 1 is a fragmentary perspective view of a sausage making machine illustrating part of the linking assembly, the looping mechanism, and part of the take-away conveyor, with the hood of the present apparatus partly broken away to show the immediately adjacent portion of the spray conduit for the liquid supply to the spray head, and the return troughs;

FIG. 2 is a fragmentary generally schematic perspective view of the link deflector and spray head with the spray conduit connected thereto and a fragmentary view of the return troughs;

FIG. 3 is a perspective view of the liquid supply tank, the liquid circulating conduit, pump and liquid spray conduit, and the end of the liquid return trough;

FIG. 4 is a fragmentary perspective view on an enlarged scale illustrating the link deflector and spray heads, with a string of linked sausages passing therethrough;

FIG. 5 is a side elevational view of the link deflector and one side of the spray head viewing FIG. 4 from the left;

FIG. 6 is a fragmentary elevational view of the link deflector and spray head seen from the end adjacent the linking assembly;

FIG. 7 is a fragmentary longitudinal sectional view showing the supply tank, the link deflector with the spray head attached thereto and the conduit connection from the supply tank to the spray head, the hood and the return troughs, with the sleeve of the looping mechanism of the sausage making machine omitted for clarity of illustration; and FIG. 8 is a fragmentary perspective view on an enlarged scale illustrating the return trough structure separate from the sausage making machine.

DETAILED DESCRIPTION OF APPARATUS FOR PERFORMING THE METHOD OF THE INVENTION

Referring to the drawings in detail, and referring first to FIG. 1, a sausage making machine in accordance with the disclosure of Townsend Pat. 3,191,222 is illustrated fragmentarily, and includes a main frame, indicated generally at 10, on which a linking assembly, indicated generally at 11 is removably mounted. A conveyor frame, indicated generally at 12, has one end adjacent the frame 10 with respect to which it is longitudinally adjustable by means of an adjusting connection, indicated generally at 13; and the frame 12 supports a looping mechanism, indicated generally at 14, and a take-away conveyor, indicated generally at 15.

The looping mechanism 14 is seen in FIG. 1 to include a looping sleeve 16 through which a linked string S of sausages passes, and the looping sleeve swings in a large circle about a rotary joint 17 so as to loop successive sections of the linked string of sausages and festoon the string on hooks 15a of the take-away conveyor 15 which thus serve as racks for the festooned string of sausages. At the entrance to the looping mechanism 14 is a link deflector 18 the position of which is better illustrated in FIG. 7 and which is illustrated in detail in FIGS. 4, 5 and 6.

Referring now to FIGS. 2, 3 and 7, the apparatus for carrying out the present method, which is specifically illustrated in the present disclosure as an attachment or accessory for the sausage making machine of Pat. 3,191,222, includes a liquid supply system, indicated generally at 20, a spray head assembly, indicated generally at 21, and an excess liquid trap and return means, indicated generally at 22.

Referring now to FIG. 3, the liquid supply system includes a liquid supply tank 23 provided with a screened top closure 24, and a drain pipe 25 connects with the interior of the tank 23 through one of its side walls. The liquid supply means also includes an electric motor driven pump 26, a circulating conduit system, indicated generally at 27, and a spray conduit 28.

The circulating conduit system 27 includes a conduit providing an outflow portion 29 which connects the lower portion of the tank 23 with the low pressure side of the pump 26, and conduit providing a return portion 30 which connects the high pressure side of the pump 26 with the upper portion of the supply tank 23. A manually adjustable valve 31 is mounted in the return conduit 30 so as to provide an adjustable back pressure which forces liquid from the circulating conduit system 27 through the spray conduit 28. Connected with the spray conduit 28 are a liquid pressure gauge 32 and a liquid temperature indicator 33.

The spray head assembly 21 of the apparatus for performing the present method is best seen in relationship to the link deflector 18 in FIGS. 4, 5 and 6. The link deflector includes a flat, cast body 34 which is pivoted at 35 on the adjustable frame 12 so as to be movable from the operative position illustrated in the drawings to an inoperative position, and a spring latch 36 on the link deflector engages a rod 37 which is rigidly connected to the adjustable frame 12. Integral with the cast body 34 of the link deflector is a U-shaped guide, indicated generally at 38, with sides 39 and 40 and a bight portion 41 so that it forms an arch around the path of travel of a string of sausages S.

The spray head 21 includes a pair of blind tubes 42 provided with brackets 43 by means of which they are secured to the sides 39 and 40 of the link deflector arch by means of machine screws. As seen in FIG. 4 each of the blind tubes 42 is milled out at 44 to form a hole 45 in the side of the blind tube toward the path of the string of sausages S, with the milling cut 44 and nozzle hole 45 cooperating to provide a spray nozzle through which a liquid spray is directed against the sausages as seen in FIGS. 4 and 6.

The spray head also includes liquid feed pipes 46 which branch both ways from a receiving pipe 47 to which the end of the spray conduit 28 is connected, and the pipes 46 make liquid tight connections with the blind tubes 42.

As best seen in FIG. 6, the spray nozzles 44-45 provide wide angle sprays which are opposed to one another on opposite sides of the string of sausages S and spread far enough in a vertical direction to impinge upon one another above and below the sausages.

Referring now especially to FIGS. 1, 7 and 8, the liquid trap and return system 22 includes a hood 48 which has a side 49 that is mounted upon a portion of the adjustable frame 12, and the hood extends around the top and down both sides of the space in which the hollow arm 16 of the looping mechanism 14 swings.

Also included in the liquid trap and return means 24 is a trough system, indicated generally at 50, that includes a receiving trough 51 and a return trough 52 by means of which excess liquid delivered through the spray head 21 is returned to the supply tank 23.

As best seen in FIG. 8 the receiving trough 51 includes a transverse portion 53 provided with a flange 54 by means of which it is hung from an end of the main frame 10, and a transverse shield portion 55 is seen in FIG. 7 to project upwardly beneath the link deflector 18. Alternatively the trough 51 may be mounted on the conveyor frame 12 by suitable brackets. As best seen in FIG. 7, the transverse portion 53 of the receiving trough 51 is inclined so that liquid received in the trough flows toward a side wall 56 (FIG. 8) and out a discharge spout 57, while any liquid falling to the left of the shield 55 as seen in FIG. 8 is caught in a receiving pan 58; and liquid flows both from 57 and from 58 into the return trough 52 which is best seen in FIG. 7 to conduct it to a trough 60 which is a part of the sausage making machine and which returns the excess liquid to the tank 23. Alternatively the receiving pan 58 may be tilted to direct liquid into the transverse trough portion 53.

In operation, the pump 26 is operated to circulate a liquid surface treating material from the supply tank through the circulating conduit system 27—i.e., the conduit portion 29, the pump 26 and the conduit portion 30, and the manual valve 31 is adjusted to provide a desired back pressure as indicated by the pressure gauge 32 on the spray conduit 28. This back pressure forces liquid under pressure through the spray conduit 28, through the supply pipe 47 into the pipes 46, into the blind pipes 42, and through the nozzles 44–45 in order to subject the string of sausages S to the spray which consists of the liquid surface treating material.

The liquid is sprayed in quantities which are substantially in excess of that required for the surface treatment of the sausages, and the excess liquid is trapped and returned by the system 22.

As previously indicated in the Summary of the Invention, the liquid surface treating material may be a dilute solution of Orange B certified food color, or it may be a commercially available dilute solution of liquid smoke which is used to impart a smoky flavor to sausages which do not actually pass through a smokehouse, or the liquid surface treating material may be anythting else which is desirably applied to the cased and linked sausages before they are subjected to further processing such as smoking or cooking.

The foregoing detailed description is given for clearness of understanding only and no unnecessary limitations are to be understood therefrom, as some modifications will be obvious to those skilled in the art.

I claim:

1. In the manufacture of long strings of sausages which are continuously stuffed at high speed, formed into a linked string, and thereafter moved at high speed in a predetermined linear path for further processing, the improvement which comprises:

directing a liquid surface treating material in opposed horizontal sprays continuously toward opposite sides of the linked string of sausages as said linked string moves in said predetermined path, said opposed sprays forming spray patterns which impinge upon one another above and below the sausages.

2. The method of claim 1 in which liquid from a supply source is directed toward the sausages in a quantity substantially in excess of that required for surface treatment, and in which the excess liquid is trapped and returned to the supply source.

References Cited
UNITED STATES PATENTS

| | | | |
|---|---|---|---|
| 3,061,446 | 10/1962 | Norman et al. | 99—169 X |
| 3,255,689 | 6/1966 | Kielsmeier et al. | 99—229 X |
| 3,576,158 | 4/1971 | Greenspan et al. | 99—484 |
| 3,672,913 | 6/1972 | Podebradsky | 99—109 |
| 3,620,766 | 11/1971 | Wallace | 99—109 |

HYMAN LORD, Primary Examiner